United States Patent [19]
Kamiya

[11] Patent Number: 5,181,256
[45] Date of Patent: Jan. 19, 1993

[54] PATTERN RECOGNITION DEVICE USING A NEURAL NETWORK

[75] Inventor: Shin Kamiya, Nara, Japan
[73] Assignee: Sharp Kabushika Kaisha, Japan
[21] Appl. No.: 633,302
[22] Filed: Dec. 24, 1990

[30] Foreign Application Priority Data

Dec. 28, 1989 [JP] Japan ............................. 1-339957

[51] Int. Cl.$^5$ .............................................. G06K 9/62
[52] U.S. Cl. .................................... 382/14; 382/30; 395/21
[58] Field of Search ................. 382/14, 15, 30, 34, 382/42; 395/21, 23, 77, 20

[56] References Cited

U.S. PATENT DOCUMENTS

| | | | |
|---|---|---|---|
| 4,651,289 | 3/1987 | Maeda et al. | 382/15 |
| 4,761,746 | 8/1988 | Tano et al. | 382/15 |
| 5,052,043 | 9/1991 | Gaborski | 382/14 |
| 5,067,164 | 11/1991 | Denker et al. | 382/15 |
| 5,073,955 | 12/1991 | Evers | 382/14 |

FOREIGN PATENT DOCUMENTS 1-241667 9/1989 Japan .

Primary Examiner—Joseph Mancuso
Attorney, Agent, or Firm—Nixon & Vanderhye

[57] ABSTRACT

A pattern recognition device has a DP matching section. The DP matching section performs frequency expansion DP matching to a standard pattern and a characteristic pattern obtained from input voice waveform to obtain a DP score and DP path pattern. It is determined by means of a category identification neural network using the DP path pattern obtained from the DP matching section whether a category of the standard pattern and a category of the characteristic pattern are the same, and a determination result corresponding to the degree of identification is obtained. A normalized DP score, which is the DP score normalized for individual differences within a required range, is then obtained in a divider by compensating the DP score using the determination result.

5 Claims, 3 Drawing Sheets

PATTERN RECOGNITION DEVICE USING A NEURAL NETWORK

BACKGROUND OF INVENTION

The present invention relates to an improvement in pattern recognition using a dynamic programming method.

In general, even when the same person says the same word, the word length changes each time the word is pronounced, with the length increasing or decreasing non-linearly on the time axis. Specifically, the word length contains an irregular amount of allowable distortion with respect to the time axis in the word length. As a result, it is necessary for the time axis to expand and contract in, for example, voice recognition for the same phonemes to correspond in the standard pattern and the characteristic pattern of the input voice. This can be accomplished by using a method called dynamic programming (DP). DP matching is a method whereby DP is used for time expansion matching of the characteristic pattern and the standard pattern, and is an important technique used in voice recognition.

In recent years the inventor and others have proposed (Nakagawa, kamiya, Sakai: Recognizing voiced single words of a non-specific speaker based on simultaneous non-linear expansion of time axis, frequency axis, and intensity axis in the voice spectrum, The Transactions of the Institute of Electronics and Communication Engineers of Japan, '81/2 Vol. J64-D No. 2) a speaker adaptation method which applies DP matching to cope with characteristic pattern variations in the voice signal resulting from individual differences, and through testing have confirmed the effectiveness of this method.

The above speaker adaptation method focuses on the fact that characteristic pattern variations resulting from individual differences appear as primarily irregular allowable distortion on the frequency axis, and uses dynamic programming for frequency expansion matching. Specifically, the single vowel /a/ is pronounced as a keyword, and the spectrum in the steady portion of this vowel /a/ is compared with the spectrum in the steady portion of the same vowel /a/ of the standard speaker by means of dynamic programming matching on the frequency axis. The direction of the shift on the frequency axis of the vowel /a/ spectra between the input and standard speakers is then detected, and this detected direction of shift on the frequency axis of the vowel /a/ spectra between the input and standard speakers is used for speaker adaptation in actual word recognition.

However, when it is attempted to normalize the degree of shift in addition to the direction of shift on the frequency axis of the single vowel /a/ spectrum in the above speaker adaptation method, phoneme differences are normalized as well as individual differences, resulting in the problem of cases in which word recognition may not be possible even though individual differences are removed.

SUMMARY OF THE INVENTION

Accordingly, an essential object of the present invention is to provide a pattern recognition device which can correctly recognize the category of pattern having allowable distortion by means of normalizing in the required range the allowable distortion of the pattern containing allowable distortion from, for example, individual differences.

In order to accomplish the above object, the pattern recognition device comprises a DP matching section which applies a DP matching to a characteristic pattern expressing characteristics of input information and a standard pattern representative of each of multiple categories, including a category to which the input information belongs, to generate a DP score expressing a total sum of distances along an optimum path and a DP path pattern expressing the optimum path as a matrix pattern;

a category identification neural network to which are input values of elements of the DP path pattern generated by the DP matching section, determines whether a category of the characteristic pattern and a category of the standard pattern are the same, and outputs a determination result which expresses the degree of the determination; and a normalized DP score generator which compensates the DP score generated by the DP matching section using the determination result output from the category identification neural network, and thus generates a normalized DP score normalizing an allowable distortion in the characteristic pattern.

A characteristic pattern expressing the characteristics of specific information is input to the DP matching section. In this DP matching section, DP matching is applied to the input characteristic pattern and the standard patterns representing each of multiple categories, including the category to which this information belongs. As a result, a DP score, which is the total sum of the distances along the optimum path, and a DP path pattern, which expresses this optimum path with a matrix pattern, are generated. The value of the elements forming the DP path pattern generated in the DP matching section is then input to a category identification neural network. Whether the category to which the standard pattern belongs and the category to which the characteristic pattern belongs are the same category is determined by means of this category identification neural network, and an identification result expressing the degree of identification is output.

The DP score generated by the DP matching section and the identification result from the category identification neural network are then input to a normalized DP score generator. The DP score is then corrected using the identification result by the normalized DP score generator, generating a normalized DP score in which the allowable distortion of the characteristic pattern has been normalized.

Specifically, a normalized DP score wherein the allowable distortion is normalized according to the identification capacity of the category identification neural network is obtained. Therefore, DP matching of a type corresponding to the contents of the allowable distortion to be normalized is applied, and by setting the identification capacity of the category identification neural network through learning according to the contents of the allowable distortion to be normalized and the degree of normalization to be applied, a normalized DP score is obtained in which the allowable distortion to be normalized in the characteristic pattern is normalized in the required range.

A pattern matching device according to the present invention comprises a DP matching section, category identification neural network, and normalized DP score generator, generates a DP score and DP path pattern relating to the characteristic pattern and the standard pattern by means of the DP matching section, determines by means of the category identification neural network whether the category to which the characteristic pattern belongs and the category to which the standard pattern belongs are the same category based on the DP path pattern, and generates by means of the normalized DP score generator a normalized DP score based on the identification result from the category identification neural network and the DP score, and thereby obtains a normalized DP score wherein the allowable distortion of the characteristic pattern is normalized in the required range according to the identification result of the category identification neural network.

Therefore, if the type of DP matching is selected according to the contents of the allowable distortion to be normalized, and the identification capacity of the category identification neural network is set according to the contents of the allowable distortion to be normalized and the desired degree of normalization, a normalized DP score wherein the allowable distortion to be normalized in the characteristic pattern is correctly normalized is generated.

Specifically, using a normalized DP score obtained according to the present invention as described above, the category to which belongs a pattern containing allowable distortion as results, for example, from individual differences can be correctly identified.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF PREFERRED EMBODIMENTS

The preferred embodiment according to the present invention is described hereinbelow with reference to the accompanying figures.

Figure 1:
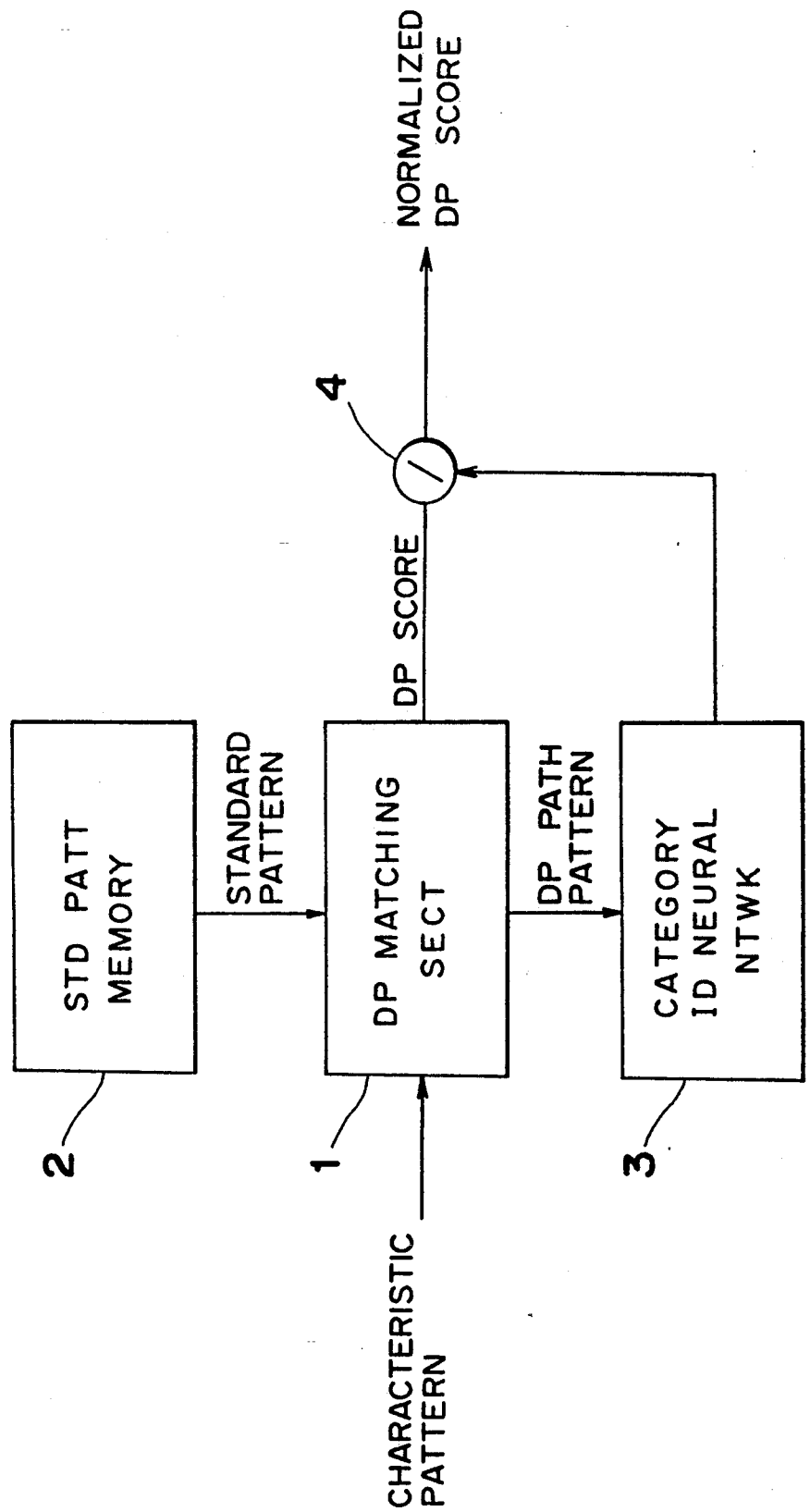
FIG. 1 is a block diagram of a preferred embodiment of a pattern recognition device according to the present invention.

FIG. 1 is a block diagram of the preferred embodiment of a pattern recognition device according to the present invention. A characteristic pattern expressing the characteristics of a voice wave or a text image is input to the DP matching section 1. This causes dynamic programming matching of the input characteristic pattern and the standard pattern stored in a standard pattern memory 2 to be executed as will be described in detail below to obtain a DP score and a DP path pattern. The resulting DP path pattern is input to the category identification neural network 3, and the DP score is input to the divider 4.

It is determined in the category identification neural network 3 whether the category of the characteristic pattern is the same category as that of the standard pattern based on the DP path pattern input from the DP matching section 1. The identification result from the category identification neural network 3 is then input to the divider 4. Based on the identification result and the DP score from the DP matching section, the divider 4, calculates a normalized DP score, which is the DP score normalized for individual differences.

The DP matching performed by the DP matching section 1 and the category identification neural network 3 are described in detail below using a characteristic pattern based on a voice wave as an example of the characteristic pattern.

The characteristic pattern input to the DP matching section 1 is generated as follows. Specifically, the voice wave is analyzed by an L channel filter bank wherein L presents the number of channels in the filter bank, and sampled every 10 ms (frame). The output values of the L channels in each frame are normalized as the total sum of the squares of each output value to generate the characteristic pattern. Hereinafter, the series comprising the normalized values obtained for each channel as thus described is referred to as power spectrum. The power spectra thus obtained for two voice waves are referred to as power spectrum A and power spectrum B, and the normalized output values of each channel in these power spectra are respectively output value ai and output value bj (however, $1 \leq i, j \leq L$).

Figure 2:
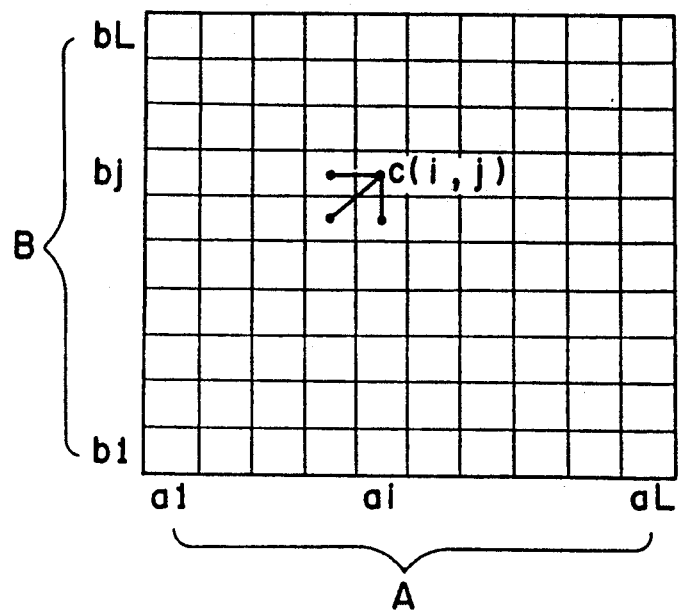
FIG. 2 shows a sample DP path pattern.

Let us now consider the plane as shown in FIG. 2 based on power spectrum A (e.g., the standard pattern) and power spectrum B (e.g., the input characteristic pattern). The correlation of the frequency of each pattern can be expressed as the series (path) at grid point $c=(i, j)$ on this plane. Thus, the value of the total sum G (hereinafter the DP score) of the distances along the optimum path (hereinafter the DP path) between both patterns is obtained by repeatedly calculating the value of the partial sum g (i, j) shown in Equation 1 while increasing the values i, j within the range of a well-formed window.

$$g(i, j) = \min \begin{pmatrix} g(i, j-1) + d(i, j) \\ g(i-1, j-1) + 2d(i, j) \\ g(i-1, j) + d(i, j) \end{pmatrix} \quad 1$$

$$G = g(L, L)/2L$$

where $d(i, j) = |ai - bj|$.

The smaller the value of the DP score calculated from Eq. 1, the smaller is the total sum of the distances along the DP path between the patterns, and it may be concluded that the patterns have well similar shapes when frequency expansion within the range of the well-formed window is applied. In other words, the DP score indicates the degree to which both patterns belong to the same category.

Figure 3:
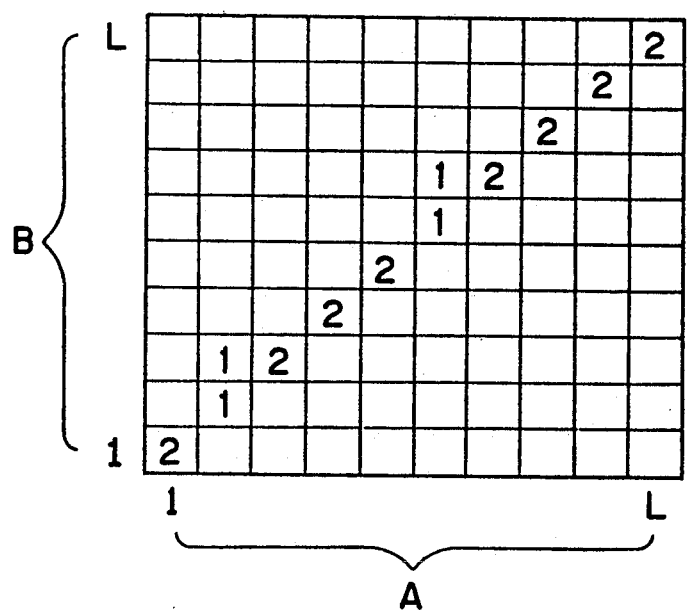
FIG. 3 shows a specific example of a DP path pattern.

FIG. 3 is a graph showing an example of the series of grid points c(i, j) rendering DP score obtained based on Eq. 1, in other words, the matrix pattern used to express the DP path (hereinafter a matrix pattern thus expressing the DP path is referred to as the DP path pattern). This DP path pattern applies a value of "2" to the grid point c(i, j) when one ai corresponds to one bj (i.e., when only one g(i, j) exists). When two bj correspond to one ai (i.e., two g(i, j) exist: when g(i, j1)=g(i, j2), 1 is assigned to grid points c(i, j1) and c(i, j2)), 0 is assigned to all grid points c(i, j) not on the path (this 0 is omitted from FIG. 3). Thus the DP path pattern is expressed as a vector grid of (L×L) dimensions.

Because there are many grid points (i, j) in the DP path pattern in FIG. 3 to which 2 is assigned on a diagonal line, it may be concluded that the patterns of the two power spectra correspond well on the frequency axis.

However, as shown above, even with a characteristic pattern belonging to the same phoneme category there is a degree of allowable distortion on the frequency axis depending upon the speaker. However, if the range of the well-formed window in DP matching is made larger than necessary in order to normalize the allowable distortion on the frequency axis resulting from individual differences, phoneme differences will also be normalized as described above.

Therefore, in the present invention, it is determined by means of a neural network whether the category of the input characteristic pattern belongs to the category of the standard pattern with consideration given to distortion on the frequency axis based on the above DP path pattern, and individual differences are normalized within the necessary range by compensating the DP score using this determination result.

Next is described the category identification neural network 3 in FIG. 1 used to determine whether the category of the characteristic pattern of the input voice belongs to the category of the standard pattern.

Figure 4:
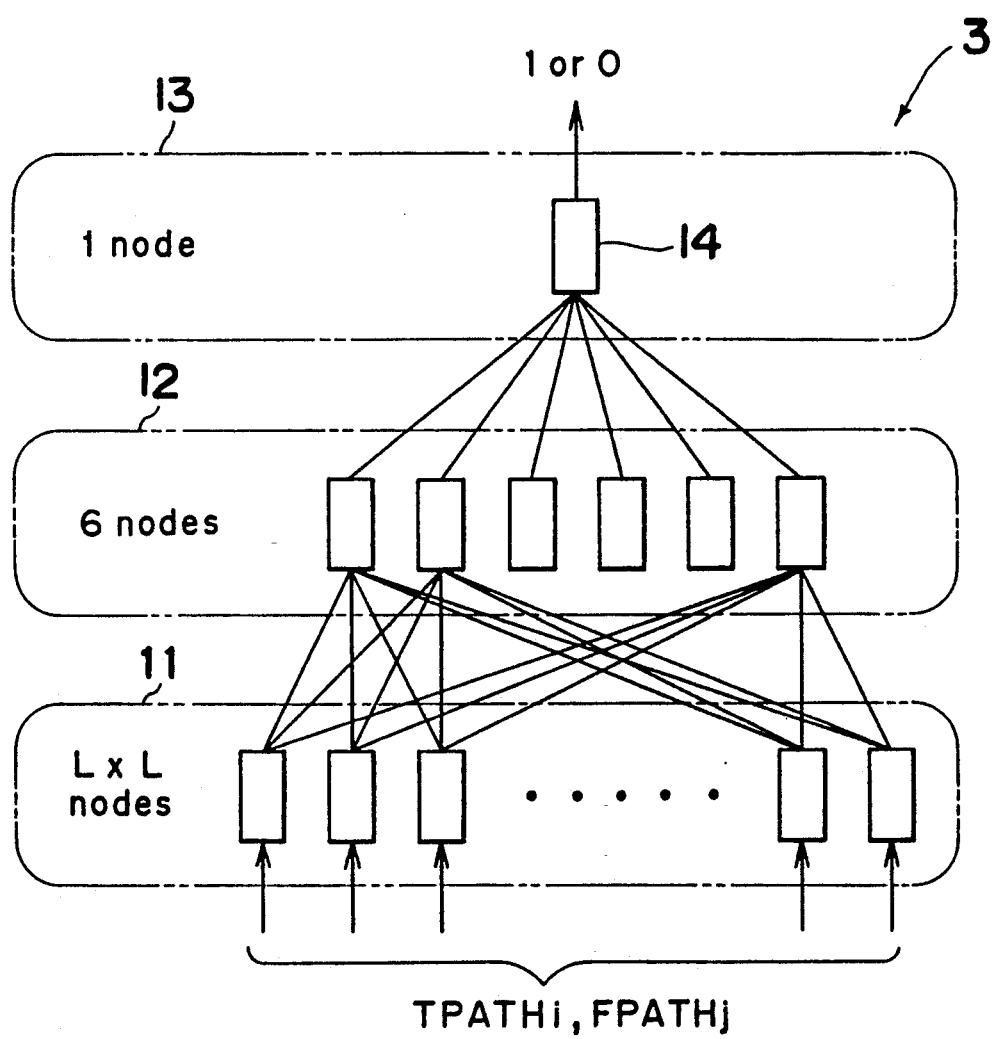
FIG. 4 is a simplified illustration of one example of a category identification neural network.

FIG. 4 is a simplified descriptive diagram of the category identification neural network 3. This category identification neural network 3 is a multiple layer perception-type neural network comprising three layers: an input layer 11, an intermediate layer 12, and an output layer 13. While the input layer 11 has (L×L) nodes, the intermediate layer 12 has six nodes. Each of the nodes in the intermediate layer 12 is connected to all of the nodes in the input layer 11. The output layer 13 has one node 14, which is connected to all nodes in the intermediate layer 12. All connections between nodes are weighted, and the value of the weight of these connections is determined by learning.

To each of the (L×L) nodes in the input layer 11 is input each element value of the DP path pattern, which is an (L×L) dimension vector.

Learning the weights of the connections in this category identification neural network 3 is accomplished by error back-propagation method. First, the learning data is generated as follows.

For each phoneme category, DP matching is applied to the i characteristic pattern (power spectrum) and to the standard pattern (the power spectrum representing the phoneme category) belonging to that phoneme category to obtain the DP path pattern TPATHi as described above. In addition, for each phoneme category, DP matching is also applied to the j characteristic pattern and to the standard pattern belonging to the phoneme categories similar to that phoneme category to obtain the DP path pattern FPATHj. The DP path pattern TPATHi and DP path pattern FPATHj are used as the learning data.

This learning data is next used for learning. First, the element values of the DP path pattern TPATHi obtained from the two patterns belonging to the same category are input to the nodes of the input layer 11. At this time the teacher data "1" is input to the node 14 of the output layer 13. In addition, the element values of the DP path pattern FPATHj obtained from the two patterns belonging to the similar categories are input to the nodes of the input layer 11. At this time the teacher data "0" is input to the node 14 of the output layer 13. Thus, the values of the weight of each connection are automatically determined so that the category identification neural network 3 outputs a "1" from the node 14 of the output layer 13 when the characteristic pattern related to the input DP path pattern and the standard pattern belong to the same category, and when they do not belong to the same category, a "0" is output from the node 14.

By using DP path pattern TPATHi and DP path pattern FPATHj for a large number of speakers of differing ages, sex, linguistic environments, speaking habits and patterns as learning data, it is possible to determine whether the category of the characteristic pattern and the category of the standard pattern are the same regardless of the speaker.

A category identification neural network 3 wherein the weight of the connections is determined by learning determines as described below whether the category of the characteristic pattern of the input voice and the category of the standard pattern are the same. Specifically, the (L×L) dimension vector DP path pattern obtained by DP matching the characteristic pattern and the standard pattern is input to the (L×L) nodes of the input layer 11. Each node of the category identification neural network 3 thus calculates the output value according to a specific output function using the weight of the connections determined by learning, and outputs the calculation result to the node connected in the layer above.

As a result, when it is judged that the category including the characteristic pattern and the category including the standard pattern are entirely the same, the node 14 of the output layer 13 outputs "1", and when it is judged that the category of the characteristic pattern is completely different from the category of the standard pattern, the node 14 of the layer 13 outputs "0", and further the node 14 outputs a value between "0" and "1" according to the degree of similarity between the categories of the characteristic and standard patterns.

The operation executed to calculate the normalized DP score based on the DP matching result in the DP matching section 1 and the determination result of the category identification neural network 3 is described next with reference to FIG. 1 and FIG. 4.

As stated above, the power spectrum obtained from the input voice is input in the DP matching section 1 as the characteristic pattern. Then, the DP matching section 1 reads the standard pattern stored in the standard pattern memory 2, performs frequency expansion DP matching on the characteristic pattern and the standard pattern, and thus generates the DP score and the DP path pattern. This DP score may be considered to express the degree by which both patterns correspond to the same category within the limits of the well-formed window set during execution of DP matching. However, if the range of the window is greater than necessary, normalization is applied even to the phoneme differences, making it impossible to consider the sameness of the categories of the characteristic and standard patterns using the DP score. Thus, the determination result obtained from the category identification neural network 3 is used to compensate the DP score as described below.

As described above, the (L×L) dimension vector of the DP path pattern obtained by the DP matching section 1 is input to the (L×L) nodes of the input layer 11 in the category identification neural network 3. Thus, the category identification neural network 3 determines whether the categories of the characteristic and standard patterns are the same using weights of the node connections, and outputs a value between 0 and 1 from the node 14 of the output layer 13 according to the degree of the determination.

The output value from this category identification neural network 3 and the DP score from the DP matching section 1 are then input to the divider 4. Thus, the value of the DP score is divided by the output value of the category identification neural network 3, and the result is output as the normalized DP score.

Specifically, the value of the DP score is increased by means of the determination result from the category identification neural network 3 according to the degree by which the category of the characteristic pattern and the category of the standard pattern are not the same. This makes it possible to avoid erroneously identifying a characteristic pattern and standard pattern belonging to different categories as belonging to the same category due to the range of the well-formed window of the DP matching section 1 being set unnecessarily large. In other words, the degree of normalization applied to individual differences (specifically to the allowable distortion on the frequency axis) by DP matching can be automatically set. By so doing, the disadvantage of DP matching, specifically the normalization of even phoneme differences when the frequency expansion range is increased to normalize for individual differences, can be compensated for. In addition, disadvantages of neural networks, specifically the reliability of recognition and the difficulty of outputting an intermediate value which can be used for the matching distance, can also be compensated for.

Stated otherwise, the normalized DP score can be considered an outstanding determination value which can be used to improve the reliability of recognition and as the matching distance, and to obtain recognition results which do not depend upon the speaker. Therefore, by using a normalized DP score, correct voice recognition which is not speaker-dependent can be easily executed.

As thus described, frequency expansion DP matching is applied to the standard pattern and the characteristic pattern (power spectrum) obtained from the input voice waveform to obtain a DP score and DP path pattern by means of the DP matching section 1. Next, it is determined by means of the category identification neural network 3 using as the input the DP path pattern obtained from the DP matching section 1 whether the category of the standard pattern and the category of the characteristic pattern are the same, and a determination result corresponding to the degree of identification is obtained. A normalized DP score, which is the DP score normalized for individual differences within a required range, is then obtained in the divider 4 by compensating the DP score using the determination result.

Therefore, using a pattern recognition method according to the present invention, an intermediate value which can be used for recognition reliability and as the matching distance is obtained, and the characteristic pattern of the input voice can be correctly recognized based on a normalized DP score which normalizes individual differences.

It is to be noted that while a three-layer perception-type neural network is used for the category identification neural network 3 in the preferred embodiment described hereinabove, the category identification neural network 3 in this invention may be a neural network of any construction. Furthermore, the learning method shall not be limited to error back-propagation, but may be any learning method appropriate to the structure of the neural network.

In the description of the preferred embodiment hereinabove, frequency expansion matching was used by way of example for the DP matching process applied in the DP matching section 1, but the invention shall not be so limited. Specifically, time expansion matching or spatial position expansion matching whereby the spatial position is expanded may also be used, for example, according to the contents of the allowable distortion in the characteristic pattern. Furthermore, time expansion matching and frequency expansion matching, for example, may also be used together.

In the description of the preferred embodiment hereinabove, recognition of a characteristic pattern in an input voice waveform was used to describe the invention by way of example, but the invention shall not be so limited and may be used to recognize characteristic patterns in text images without any problems. In this case, spatial expansion matching may be used for DP matching in the DP matching section 1.

The invention being thus described, it will be obvious that the same nay be varied in many ways. Such variations are not to be regarded as a departure from the spirit and scope of the invention, and all such modifications as would be obvious to one skilled in the art are intended to be included within the scope of the following claims.

What is claimed is:

1. A pattern recognition device comprising:
a dynamic programming matching section which applies a dynamic programming matching to both a characteristic pattern which expresses characteristics of input information and a standard pattern which expresses each of multiple categories inclusive of a category to which the input information belongs, and which thereby generates a dynamic programming score expressing a total sum of distances along an optimum path and a dynamic programming path pattern expressing the optimum path as a matrix pattern;
a category identification neural network to which are input values of elements of the dynamic programming path pattern generated by the dynamic programming matching section, and which determines whether a category of the characteristic pattern and a category of the standard pattern are the same, and which outputs a determination result which expresses the degree of the determination; and
a normalized dynamic programming score generator which compensates the dynamic programming score generated by the dynamic programming matching section using the determination result output from the category identification neural network, and thus generates a normalized dynamic programming score normalizing an allowable distortion in the characteristic pattern.

2. The pattern recognition device according to claim 1, wherein the category identification neural network is a multiple layer perceptron-type neural network.

3. The pattern recognition device according to claim 2, wherein learning weights of connections of node in the multiple layer perceptron-type neural network is accomplished by error back-propagation method.

4. The pattern recognition device according to claim 1, wherein a normalized dynamic programming score generator is a divider which divides the dynamic programming score from the dynamic programming matching section by the determination result from the category identification neural network.

5. The pattern recognition device according to claim 1, wherein the dynamic programming matching section performs frequency expansion dynamic programming matching on the characteristic pattern and the standard pattern.

* * * * *